Jan. 11, 1927.
J. A. COSTELLO
1,613,644
HOSE AND PIPE COUPLING
Filed Jan. 23, 1925   2 Sheets-Sheet 2
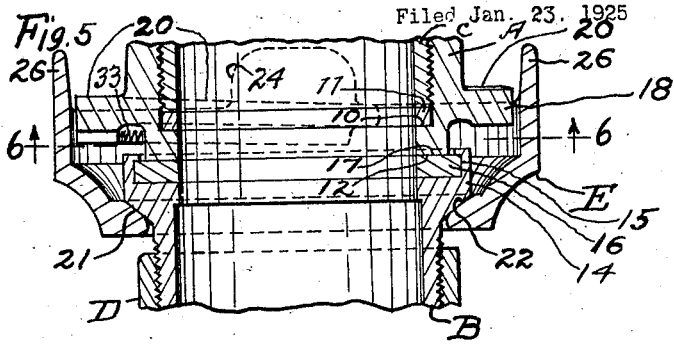
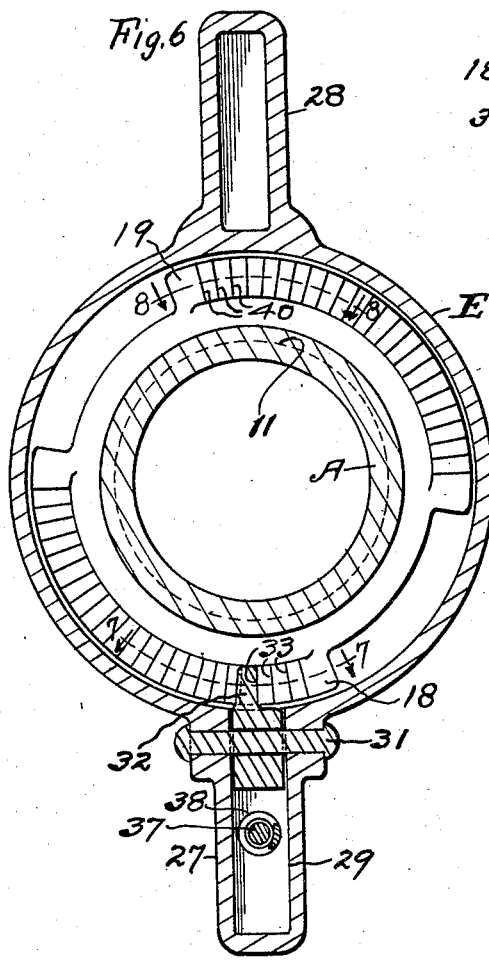
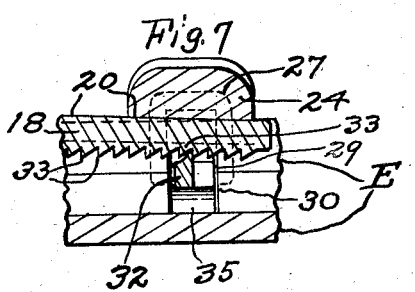
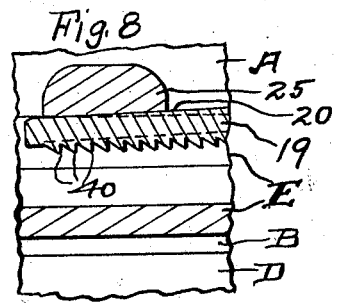
Inventor:
Joseph A. Costello
By *[signature]*
his Attorney.

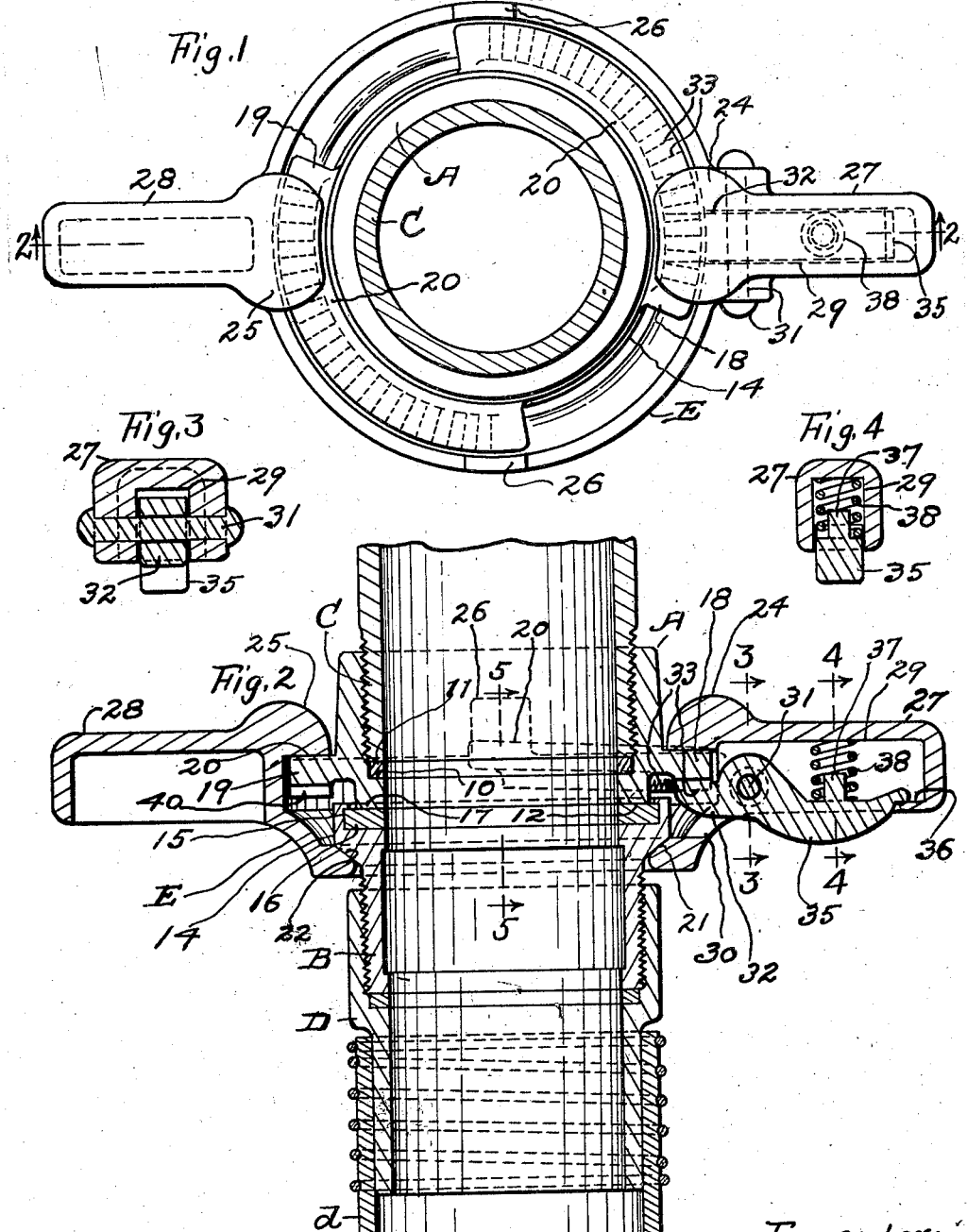

Patented Jan. 11, 1927.

1,613,644

UNITED STATES PATENT OFFICE.

JOSEPH A. COSTELLO, OF CLEVELAND, OHIO, ASSIGNOR TO THE CLEVELAND BRASS MANUFACTURING COMPANY, OF CLEVELAND, OHIO, A CORPORATION OF OHIO.

HOSE AND PIPE COUPLING.

Application filed January 23, 1925. Serial No. 4,245.

This invention relates to improvements in hose and pipe couplings, and pertains more especially to an upright coupling to be employed in removably attaching a rigid tubular member, embraced by and secured to the end of the hose, to the spout of a faucet in which the discharging end portion of said spout is arranged substantially vertically and adapted to discharge downwardly and to deliver liquid or fluid, through the medium of said coupling, to said hose.

One object of this invention is to produce a highly practical coupling of the character indicated whereby a hose is quickly attachable to and detachable from an upright discharging end portion of the spout or outlet-member of a faucet or other fluid-delivering device.

Another object is to produce a coupling comprising an upright upper coupling-member, a lower coupling-member arranged under and substantially in line endwise and communicating with the upper coupling-member and adapted to abut against the lower end face of the upper coupling-member, and improved means for clamping or shifting said lower coupling-member into fluid-tight engagement with said face of the upper coupling-member.

Another object is to provide improved means whereby the lower coupling-member, after shifting into fluid-tight engagement with the upper coupling-member, is prevented from loosening in relation to said upper coupling-member.

Another object is to render the coupling convenient, efficient and reliable.

Another object is to facillitate the assemblage of the component parts of the coupling, and to render the coupling simple and durable in construction.

With these objects in view, and to attain other objects hereinafter appearing, this invention consists in certain features of construction, and combinations and relative arrangements of parts, hereinafter described in this specification, pointed out in the claims, and illustrated in the accompanying drawings.

In said drawings, Figure 1 is a top plan of a coupling embodying my invention, and in said figure the head coupling-member is attached to the body of a spout which is shown in transverse section. Fig. 2 is a central vertical section taken along line 2—2 in Fig. 1, and shows the head member of the coupling applied as required to form the fluid-discharging end of a spout or fluid-delivering member shown in Fig. 1, and Fig. 2 also shows the attachment, to the tail member of the coupling, of a rigid tubular member embraced by an end of a hose and removably secured to the tail coupling-member. Figs. 3 and 4 are vertical sections taken along line 3—3 and line 4—4, respectively in Fig. 2, looking outwardly. Fig. 5 is a central vertical section taken along line 5—5 in Fig. 2. Fig. 6 is a horizontal section taken along line 6—6 in Fig. 5, looking upwardly. Fig. 7 is a section taken along the curved line 7—7 in Fig. 6, looking outwardly. Fig. 8 is a section taken along the curved line 8—8 in Fig. 6, looking inwardly.

My improved hose and pipe coupling comprises two upright fluid-conducting annular metal coupling-members A and B, and in Figs. 2 and 5 the member B is shown arranged under and in line endwise with the member A.

The upper or head coupling-member A is preferably provided, internally of its lower end portion, with an upwardly facing annular shoulder 10 forming a seat for a washer 11, and said coupling-member is screw-threaded internally between its upper extremity and said washer and shown, in Fig. 2, as screwed onto the correspondingly externally threaded and substantially vertically arranged tubular discharging end portion C of the metal body of a spout or member for delivering liquid or fluid. Said coupling-member A has an annular lower end face 12 which is substantially concentric in relation to said member.

The lower or tail coupling-member B is supported from or connected to the head coupling-member A as will hereinafter appear and in communication, at its upper end, with said head coupling-member and has a diametrical annular enlargement 14 at its upper extremity. Said enlargement 14 of the coupling-member B has an undercut annular internal recess 15 containing a gasket 16 composed of suitable elastic and compressible material such, for instance, as leather. The tail coupling-member B is externally threaded below its enlargement 14 so as to permit the screwing, onto said coupling-member, of an internally screw-threaded tubular metal piece D embraced by an end of a hose $d$ secured to said member D in any approved manner and adapted to be employed in conducting fluid from the coupling to the place desired.

The gasket 16 forms an annular upper end face 17 on the tail coupling-member B, and said end face is opposite and adapted to abut against and covers the adjacent end face 12 of the head coupling-member A, and it will be observed that said gasket 16 measures more than the end face 12 of the head coupling-member in external diameter and extends outwardly from the circumference of said face.

The lower end portion of the upper coupling-member A and the upper end portion of the lower coupling-member B are surrounded by an upright rotatable metal sleeve E which, as will hereinafter appear, is adapted to participate in effecting clamping relation between the adjacent end faces 12 and 17 of said coupling-members A and B.

The head coupling-member A (see Figs. 1, 2 and 6) has two corresponding external flanges 18 and 19 formed at opposite sides respectively of the coupling and preferably arranged diametrically opposite. Said flanges extend and are spaced circumferentially of the coupling, and are arranged near but spaced substantially equidistantly from the end face 12 of the head coupling-member A, and each of said flanges has a sloping top surface 20 extending circumferentially and endwise of the coupling.

The lower or tail fluid-conducting member B has an annular and preferably segmentally spherical and convex laterally outwardly and downwardly facing shoulder 21 formed on and externally of the enlargement 14 of said member B and arranged to form the bottom of said enlargement.

The sleeve E extends opposite the circumferential edges of the flanges 18 and 19 of the upper coupling-member A and is spaced from and therefore loose in relation to said edges, as shown in Figs. 1, 2, 5 and 6. The lower portion of said sleeve (see Figs. 2 and 5) has a laterally inwardly and upwardly facing and preferably segmentally spherical and concave annular internal shoulder 22 under and therefore opposite the shoulder 21 of the lower coupling-member B, and said sleeve extends below its shoulder 22. Below said shoulder 22 the sleeve E is spaced from the lower coupling-member B and therefore rendered loose at its lower extremity in relation to said coupling-member. Said sleeve is provided, at its upper end (see Figs. 1 and 2) with two lugs 24 and 25 which project laterally inwardly toward the axis of the sleeve and are spaced circumferentially of the upper coupling-member A and rest on or overlap the sloping top surface 20 on flanges 18 and 19 respectively, and said flanges are spaced farther apart circumferentially of the coupling than said lugs extend circumferentially of the coupling, and preferably each of said lugs is contoured at the bottom thereof to conform to the sloping surface 20 of the adjacent flange, as shown in Figs. 7 and 8. The looseness of the sleeve E below its shoulder 22 in relation to the lower coupling-member B, and the looseness of the sleeve in relation to the circumferential edges of the flanges 18 and 19 of the upper coupling-member A, permit of a suitable engagement of the sleeve at its shoulder 22 with the shoulder 21 of the lower coupling-member B regardless of some unevenness of irregularity in the opposing surfaces of each hereinbefore mentioned lug of the sleeve and associated flange of the upper coupling-member.

As already hereinbefore indicated, the upper or head coupling-member A of the illustrated coupling is applied to and rendered rigid with the portion C of a spout or member for delivering fluid, and then the sleeve E, after the assemblage of the sleeve and tail coupling-member B with the shoulder 21 of said tail coupling-member seated on the shoulder 22 of the sleeve E, is placed in position under and in such relation to the head coupling-member A that the lugs 24 and 25 on said sleeve can enter diametrically opposite spaces respectively between the flanges 18 and 19 of said head coupling-member. Then the sleeve E, supporting the tail coupling-member B, is raised or moved as required to bring the upper end face 17 of said member B into contact with the lower end face 12 of the head coupling-member A, and then the sleeve is rotated as required to bring its lugs 24 and 25 over the flanges 18 and 19 respectively.

Preferably, the sleeve E (see Figs. 1 and 5) is provided with two centering members 26 which project upwardly and therefore in the direction of the head end of the coupling and extend above the flanges 18 and 19 and are arranged at opposite sides respectively of the sleeve and spaced substantially equidistantly from the lugs 24 and 25 and substantially equidistantly from the axis of the sleeve and farther than the outer circumferential surfaces of said flanges from said axis and serve in centering the sleeve in relation to the head coupling-member A during the assemblage of the parts.

By the hereinbefore described construction it will be observed that the sleeve E is arranged wholly externally of the coupling-members A and B and spaced from and extends circumferentially of the adjacent end faces 12 and 17 of said coupling-members, that said sleeve is capable of shifting upwardly independently of the upper coupling-member A when the lower coupling-member B is loose in relation to the upper coupling-member, that the shoulder 21 of the lower coupling-member and the shoulder 22 of the sleeve constitute means whereby the required aforesaid shifting of the sleeve results in upward shifting of the lower coupling-member into clamping and fluid-tight engagement at its gasket 16 with the lower end face 12 of the upper coupling-member, that the flanges 18 and 19 of the upper coupling-member are spaced far enough upwardly from the lower coupling-member to permit upward shifting of the lower coupling-member for the purpose of taking up wear on the opposing faces of said coupling-members, that the lugs 24 and 25 of the sleeve project inwardly toward the axis of the sleeve and are arranged to extend transversely of the sloping top surface 20 of the flanges 18 and 19 respectively, and that said lugs and the surfaces 20 of said flanges constitute means whereby, when the lower coupling-member is loose in relation to the upper coupling-member, upward shifting of the sleeve occurs during the required rotation of the sleeve.

The sleeve E is provided with two handles 27 and 28 for convenience in rotating the sleeve, and said handles extend laterally and outwardly from the lugs 24 and 25 respectively and are arranged radially in relation to the sleeve. The arm 27 has an interior chamber 29 which (see Figs. 2, 3, 4 and 6) extends endwise of said arm and to the adjacent portion of the internal surface of the sleeve E, and said chamber is open at the bottom of the arm and communicates, at its inner end, with a slot 30 which (see Figs. 2, 6 and 7) is formed, at the inner end of and next below said chamber, in and extends laterally through the adjacent portion of the sleeve. A substantially horizontal pivotal pin 31 (see Figs. 2, 3 and 6) is arranged transversely of the inner end portion of the chamber 29 and supported from the arm 27, and on said pin 31, within said chamber 29 (see Figs. 2, 3 and 6) is loosely mounted a pawl 32 which extends through the slot 30 and into proximity to but is spaced outwardly from the enlargement 14 of the tail coupling-member B. Said pawl normally engages an interdental space between adjacent ratchet-teeth of a series of corresponding ratchet-teeth 33 which are formed at the bottom of and on and project downwardly from the flange 18 and extend to the outer circumference of said flange. Said series of teeth is substantially concentric in relation to the axis of the sleeve E, and the teeth of said series of teeth are substantially radial in relation to the sleeve and spaced circumferentially of the upper coupling-member A.

The pawl 32 (see Figs. 2, 3 and 4) has an arm 35 extending toward and into proximity to the outer end of the chamber 29 in the pawl-supporting handle 27 and over or opposite an upwardly facing shoulder 36 formed at the lower end of and on the outer end wall of said chamber. The pawl-arm 35 is provided, centrally between its ends, with an upwardly projecting lug 37, and a coiled spring 38 surrounds said lug and is confined between the top wall of the chamber 29 and said arm and acts to retain the pawl in its normal and operative position in which the outer end of said pawl-arm abuts against said shoulder, and said shoulder and said arm are arranged to cooperate in preventing movement of the pawl into detrimental or objectionable cutting contact with the serrated bottom of the flange 18.

Because the sleeve E is lifted by the sloping surfaces 20 of the flanges 18 and 19 during the rotation of the sleeve in the direction required to cause the lugs 24 and 25 of the sleeve to ascend said surfaces, the serrated bottom or under side of the flange 18 slopes to substantially correspond with the slope of the surface 20 on the flange, as shown in Fig. 7, so that the teeth 33 are substantially equidistantly spaced from said surface, and the series of teeth 33 extends circumferentially and endwise of the coupling. When the sleeve has to be rotated or shifted circumferentially in the direction required to cause the lugs 24 and 25 to ascend the sloping surfaces 20 on the flanges 18 and 19 so as to take up wear at the joint formed between the fluid-conducting coupling-members A and B and reestablish an effective clamping relation between said fluid-conducting members, the arms 27 and 28 of the sleeve are manually grasped and the sleeve is rotated in the direction and to the extent required to cause the pawl to move from one interdental space of the flange 18 to the next interdental space of said flange in the direction of the upper end of the sloping surface 20 on said flange until the tail coupling-member has been clamped, at its end face 17, into fluid-tight relation to the end face 12 of the head coupling-member, and the pawl again cooperates with a tooth of the series of teeth 33, as shown in Fig. 7, in preventing reverse movement of the sleeve.

The flange 19 is provided, at its bottom, with a series of ratchet-teeth 40 substantially the same as the series of teeth 33 of the flange 18 so as to render a tooth 40 of the flange 19 suitable for cooperation with the pawl 32 were the parts assembled with the pawl in engagement with an interdental space in the series of teeth 40.

The removal, from the head coupling-member A, of the tail coupling-member B clamped to the head coupling-member, obviously only requires manual grasping of the sleeve-arms 27 and 28 and actuation of the pawl 32 into an inoperative position and holding the pawl in said position while rotating the sleeve in the direction and to the extent required to loosen the lugs 24 and 25 of the sleeve in relation to the sloping surfaces 20 of the flanges 18 and 19 and to bring said lugs opposite the spaces between said flanges so as to render the sleeve free to be lowered or removed from the head coupling-member and, of course, the tail coupling-member is removed with the sleeve during removal of the sleeve from the head coupling-member.

By the hereinbefore described construction it will be observed that the flanges 18 and 19 of the upper coupling-member A each have a series of downwardly projecting teeth, that the sleeve E has a laterally outwardly extending handle adapted to carry a pawl adjacent one of said flanges, that the pawl normally extends from within the handle into and is held in engagement with and withdrawable from an interdental space in the adjacent flange, that the teeth of the flanges 18 and 19 are spaced laterally outwardly from the lower coupling-member B so as not to interfere with the taking up of wear on the opposing faces of the coupling-members A and B, that both flanges 18 and 19 are substantially in correspondingly spaced relationship to the lower coupling-member, and that my improved coupling is simple and durable, highly practical, convenient and reliable. As already hereinbefore indicated, upward shifting of the lower coupling-member B into fluid-tight engagement with the upper coupling-member A has occurred when the sleeve E has been shifted upwardly to the extent required, and it will be observed that after said shifting of the sleeve during the required rotation of the sleeve in one direction the pawl 32 is in engagement with a space between adjacent teeth of the series of ratchet-teeth on the adjacent flange of the upper coupling-member, and that said pawl and said teeth are arranged to constitute means which are nonobstructive to said rotation of the sleeve and prevent rotation of the sleeve in the opposite direction.

As shown in Figs. 1, 2, 3 and 4, the top wall of the chamber 29 of the pawl-carrying handle 27 is imperforate and extends over the spring 38 and over the pawl 32 and its arm 35, so as to prevent access, to said spring and pawl, of stones, dust, dirt, snow or other matter dropping onto said handle. Of vast importance are the formation of the hereinbefore described series of downwardly projecting teeth on the bottoms of the flanges 18 and 19 and the arrangement of the toothed lower portions of said flanges internally of the sleeve E so as to materially protect said portions of said flanges against mutilation or injury.

What I claim is:—

1. A hose and pipe coupling comprising an upright upper coupling-member which has circumferentially spaced external flanges having top surfaces extending circumferentially and endwise of the coupling, a lower coupling-member arranged under and adapted to abut endwise against and communicating with the upper coupling-member and having a downwardly facing external shoulder, and a rotatable sleeve arranged externally of said coupling-members and capable of shifting upwardly independently of the upper coupling-member when the lower coupling-member is loose in relation to said upper member and having an internal shoulder opposite the first-mentioned shoulder and also having lugs spaced circumferentially of the coupling and arranged to extend over the aforesaid surfaces, said surfaces and said lugs constituting means whereby said shifting of the sleeve occurs during the required rotation of the sleeve, and said sleeve extending opposite and being loose in relation to the circumferential edges of the aforesaid flanges and having upwardly projecting centering members which extend above said flanges and are arranged in alternating and spaced relationship to said lugs and spaced farther than said edges from the axis of the sleeve.

2. A hose and pipe coupling comprising a coupling-member having circumferentially spaced external flanges, a coupling-member arranged to abut endwise against one end of and communicating with the first-mentioned member, a rotatable sleeve extending circumferentially of said coupling-members and capable of shifting toward the opposite end and independently of the first-mentioned member when the second-mentioned coupling-member is loose in relation to the first-mentioned member, the second-mentioned coupling-member and the sleeve having means whereby said shifting of the sleeve results in shifting said coupling-member into fluid-tight engagement with the first-mentioned coupling-member, the aforesaid flanges and the sleeve having means whereby said shifting of the sleeve occurs during the required rotation of the sleeve, and a movable member supported from and extending internally of the sleeve and arranged to extend adjacent one flange of the first-mentioned coupling-member, said flange having a series of teeth spaced circumferentially of the axis and arranged internally of the sleeve, and the movable member carried by the sleeve being engageable with an interdental space in said flange after the aforesaid rotation of the sleeve.

3. A hose and pipe coupling comprising an upright upper coupling-member having circumferentially spaced external flanges, a lower coupling-member arranged under and communicating with said upper member, a rotatable sleeve extending circumferentially of adjacent portions of said coupling-members and capable of shifting upwardly to the required extent independently of the upper coupling-member when the lower coupling-member is loose in relation to said upper member, the sleeve and the lower coupling-member having means whereby said shifting of the sleeve results in shifting said coupling-member into fluid-tight engagement with the upper coupling-member, the aforesaid flanges and the sleeve having means whereby said shifting of the sleeve occurs during the required rotation of the sleeve, and a movable member carried adjacent one flange of the upper coupling-member by and extending internally of the sleeve, said flange having downwardly projecting teeth spaced circumferentially of the coupling, said teeth and the adjacent portion of said flange being arranged internally of the sleeve, and the aforesaid movable member of the sleeve being normally held in engagement with and withdrawable from an interdental space in said flange.

4. A hose and pipe coupling comprising an upright upper coupling-member having two circumferentially spaced and correspondingly arranged external flanges each having downwardly projecting teeth spaced circumferentially of the coupling and a sloping top surface extending endwise and circumferentially of the coupling, a lower coupling-member arranged under and communicating with the upper coupling-member, a rotatable sleeve having lugs and capable of shifting upwardly independently of the upper coupling-member when the lower coupling-member is loose in relation to said upper member, and a movable member carried by the sleeve and normally engaging and withdrawable from an interdental space in a flange of the upper coupling-member, the lower coupling-member and the sleeve having means whereby the aforesaid shifting of the sleeve results in shifting said coupling-member into fluid-tight relation to the upper coupling-member, the aforesaid lugs and the aforesaid surfaces being arranged to effect said shifting of the sleeve during the required rotation of the sleeve, and the teeth of each flange of the aforesaid flanges being substantially equidistant from the aforesaid sloping top surface of the flange.

5. A hose and pipe coupling comprising an upright coupling-member having circumferentially spaced external flanges, a coupling member arranged to abut endwise against one end of and communicating with the first-mentioned member, a rotatable sleeve surrounding said members and capable of shifting toward the opposite end and independently of the first-mentioned member when the second-mentioned member is loose in relation to the first-mentioned member and having a handle adapted to carry a pawl, the second-mentioned coupling-member and the sleeve having means whereby said shifting of the sleeve results in shifting said coupling-member into fluid-tight engagement with the first-mentioned member, the aforesaid flanges and the sleeve having means whereby said shifting of the sleeve occurs during the required rotation of the sleeve, and a pawl carried by the aforesaid handle and extending internally of the sleeve and adjacent a flange of the first-mentioned coupling-member, said flange having teeth arranged internally of the sleeve, the pawl normally engaging and withdrawable from an interdental space in said flange, and the sleeve and its aforesaid handle being chambered and slotted to permit movability of the pawl.

6. A hose and pipe coupling comprising an upright upper coupling-member having circumferentially spaced external flanges, a lower coupling-member arranged under and adapted to abut against said upper member, a rotatable sleeve extending around said members and capable of shifting upwardly independently of said upper member when the lower coupling-member is loose in relation to said upper member and having a laterally extending handle for carrying a pawl, the lower coupling-member and the sleeve having means whereby said shifting of the sleeve results in shifting said coupling-member into fluid-tight contact with the upper coupling-member, the sleeve and the aforesaid flanges having means whereby said shifting of the sleeve occurs during the required rotation of the sleeve, and a pawl extending internally of the sleeve from within and carried by the handle and arranged to extend under the bottom of a flange of the upper coupling-member, said flange having downwardly projecting teeth arranged wholly internally of the sleeve, the pawl being normally held in engagement with and withdrawable from an interdental space in said flange, and the sleeve and its aforesaid handle being contoured to permit movability of the pawl.

In testimony whereof, I sign the foregoing specification.

JOSEPH A. COSTELLO.